(12) United States Patent
Hope

(10) Patent No.: US 6,878,428 B2
(45) Date of Patent: Apr. 12, 2005

(54) COMPOSITE WEATHERSTRIPPING

(76) Inventor: Robert B. Hope, 131 Chester Avenue, Toronto, Ontario (CA), M4K 2Z8

(*) Notice: Subject to any disclaimer, the term of this patent is extended or adjusted under 35 U.S.C. 154(b) by 103 days.

(21) Appl. No.: 10/137,417

(22) Filed: May 3, 2002

(65) Prior Publication Data

US 2002/0168507 A1 Nov. 14, 2002

Related U.S. Application Data

(60) Provisional application No. 60/289,792, filed on May 10, 2001.

(51) Int. Cl.[7] .............................. E06B 7/16; E06B 7/22; B32B 33/00
(52) U.S. Cl. .............................. 428/94; 428/92; 428/93; 428/95; 49/475.1; 49/489.1; 49/490.1
(58) Field of Search ............................ 428/85, 95, 92, 428/93, 94, 297.4; 49/475.1, 489.1, 490.1

(56) References Cited

U.S. PATENT DOCUMENTS

| | | | | |
|---|---|---|---|---|
| 4,090,910 A | * | 5/1978 | Metzler | 156/430 |
| RE30,359 E | * | 8/1980 | Metzler | 156/169 |
| 4,242,392 A | * | 12/1980 | Yackiw | 428/85 |
| 4,305,984 A | * | 12/1981 | Boyce | 428/85 |
| 4,358,497 A | * | 11/1982 | Miska | 428/85 |
| RE31,403 E | * | 10/1983 | Burrous | 156/60 |
| 5,906,877 A | * | 5/1999 | Popper et al. | 428/92 |
| RE36,372 E | * | 11/1999 | Edwards et al. | 428/85 |
| 6,711,858 B1 | * | 3/2004 | Albanese et al. | 49/475.1 |

* cited by examiner

*Primary Examiner*—Cheryl A. Juska
(74) *Attorney, Agent, or Firm*—Bereskin & Parr

(57) ABSTRACT

Weatherstripping is provided having a backing which a composite portion is either integral with or adhered to for reducing stretch and shrinkage in the weatherstripping. The composite portion is composed of strand portion, preferably a plurality of strands, embedded in a matrix. The strand portion may be fibreglass and the matrix may be polypropylene. The composite portion is bonded to or integral with the weatherstripping backing along its length such that the strand portion is oriented linearly in the same direction as the backing. The strand portion has a higher tensile modulus than the backing and thus provides resistance to stretching induced by pull forces during installation. The strand portion also tends to resist shrinkage in the backing.

17 Claims, 5 Drawing Sheets

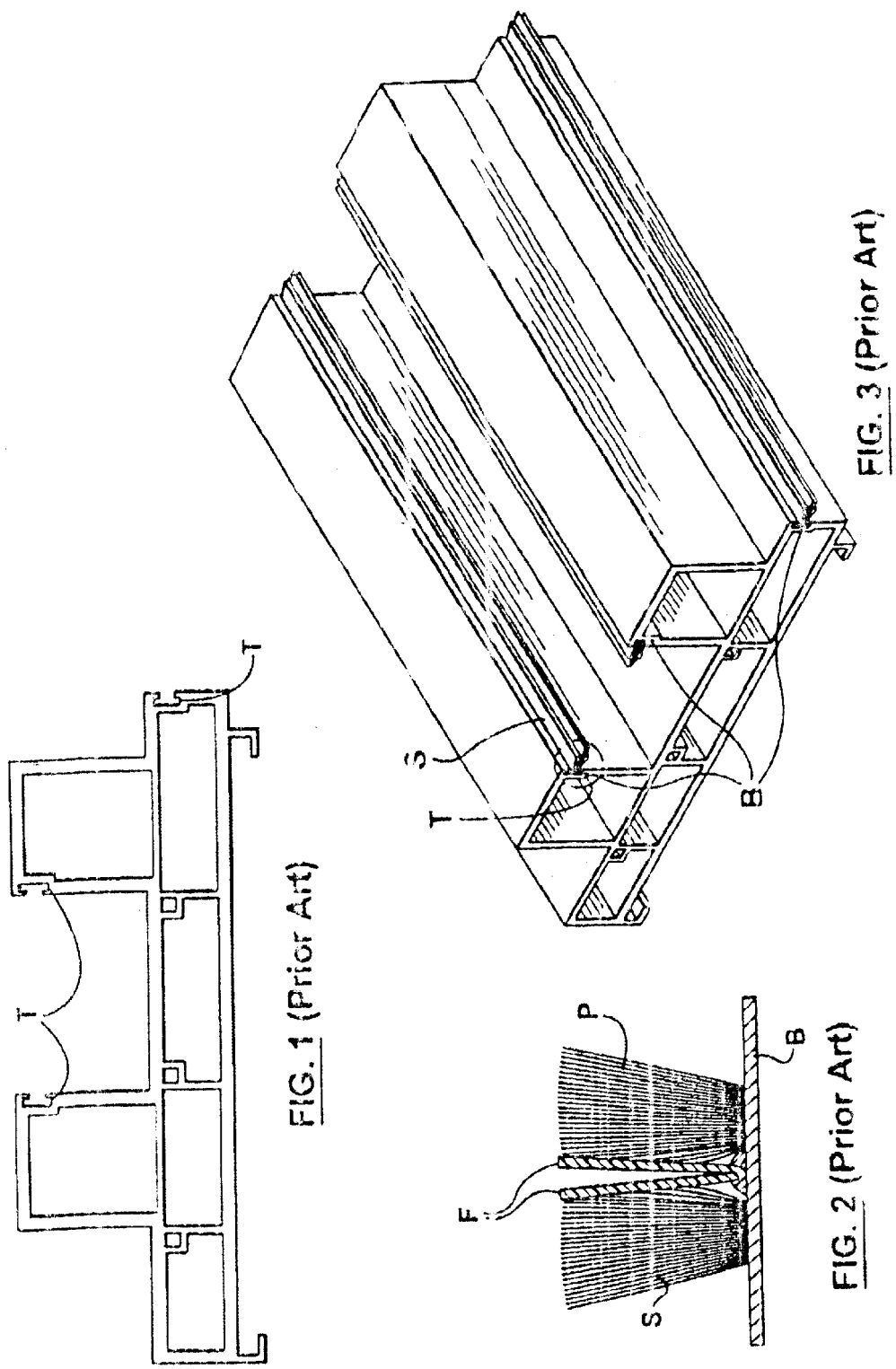

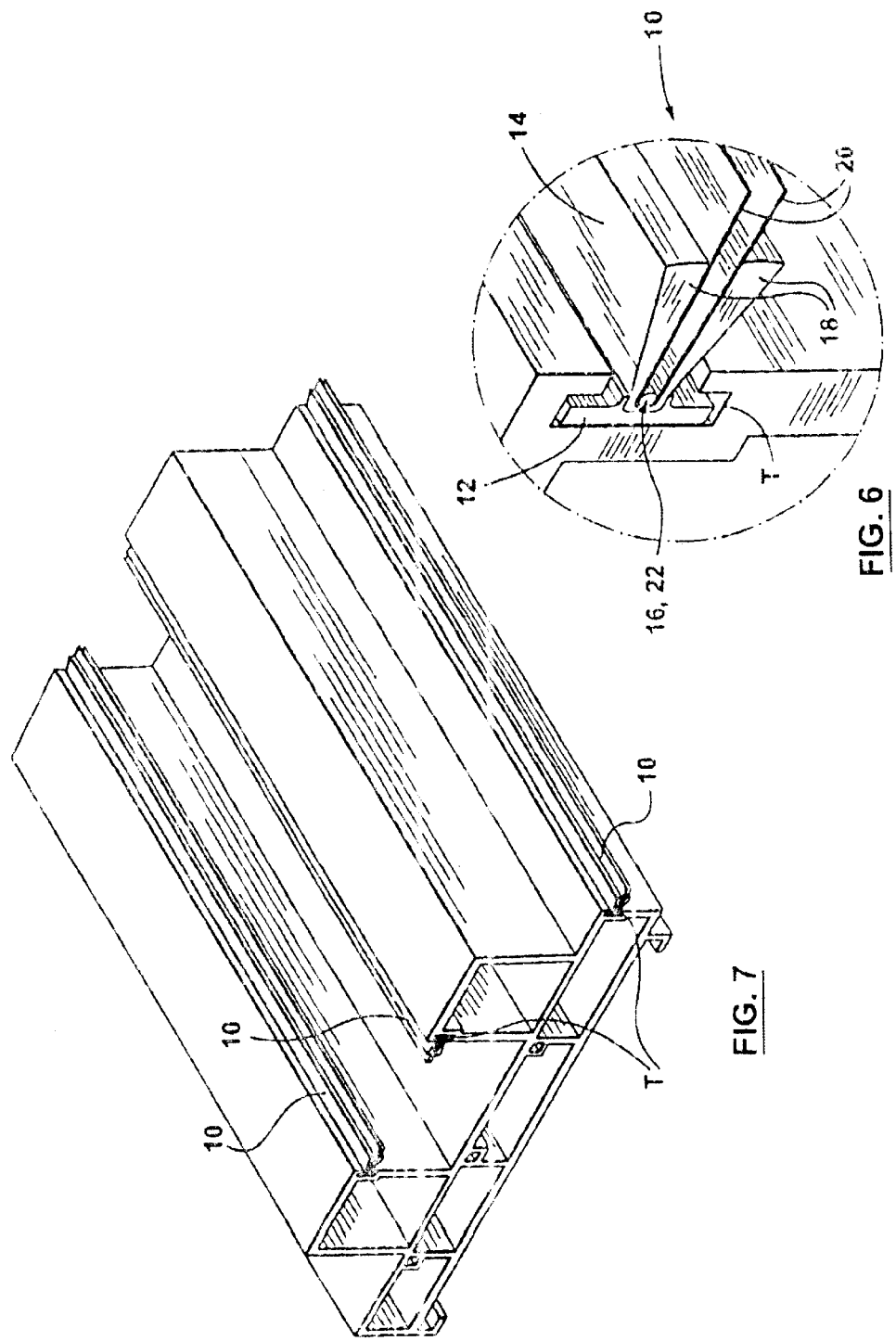

COMPOSITE WEATHERSTRIPPING

PRIOR APPLICATION

This application claims the benefit of U.S. Provisional Application Ser. No. 60/289,792, filed May 10, 2001 entitled COMPOSITE WEATHERSTRIPPING.

FIELD OF THE INVENTION

The present invention relates to weatherstripping and, in particular, to polymeric weatherstripping for use with windows and doors and their respective frames.

BACKGROUND OF THE INVENTION

Commercial windows and door frames typically provide for the attachment of weatherstripping around closure surfaces to reduce the amount of cool air and moisture that can seep around the door or window. Although weatherstripping may be attached in many ways, a typical way as shown in FIG. 1 is to provide a T-slot "T" at an appropriate location around the periphery of the door or window. Referring to FIGS. 2 and 3, weatherstripping adapted for installation in T-slot typically has a base portion or backing "B" and a sealing portion "S", which is often made of a yarn pile "P" and may include a barrier fin "F" of the type described in U.S. Pat. Nos. 3,175,256 and 4,148,953 to Horton. The base, sealing and fin portions are typically made of a thermoplastic polymer such as polypropylene. Backing B is a woven, and typically polymer coated, backing which retains the weatherstripping in the T-slot and minimizes the amount of dimensional stretch and/or shrinkage that the weatherstripping experiences as a result of stresses induced in its polymeric composition by installation and/or thermal effects of its manufacture. It is well known that thermoplastic weatherstripping, such as that made out of polypropylene, is prone to stretching and shrinkage caused by residual and induced stresses incurred during manufacture and installation. Also, the woven backing, which consists essentially of interlocking loops of polymer threads as described in U.S. Pat. No. 3,175,256 to Horton, stretches because the loops tend to straighten somewhat under a tensile load, causing an overall increase in backing length.

In most cases, installation of the weatherstripping entails inserting backing B into the T-slot of the frame member at one end and pulling it through the T-slot along its entire length until the weatherstripping is fully inserted in the T-slot. In one method of manufacture, the ends of the weatherstripping are then trimmed to the length of the window or door profile. The profile may be used immediately to construct a door or window, or may be stored with weatherstripping installed therein for later use.

Additional weatherstripping stretch is typically induced during installation. Frictional forces in the slot and variations in the slot profile along its length create a drag force on the weatherstripping as it is pulled into the T-slot. Depending on the size and shape of the profile and on the type of weatherstripping used, this drag force can be 0.5 pounds per foot of length of weatherstripping, or more. Where polypropylene weatherstripping is used, this drag force can stretch the weatherstripping more than 0.5 inches for every 10 feet of window or door profile. The amount of stretch can be increased further by the presence of an undersized slot, variations in the slot along its length, contaminants in the slot, variations in the backing thickness or width, curves or twists in the weatherstripping profile, rough surfaces on either the slot or the weatherstripping and a very long continuous profile length.

Weatherstripping shrinkage occurs due to the recovery from tensile stresses induced in the backing during the manufacture of the weatherstrip and/or its installation into the T-slot. Shrinkage is particularly worrisome because the weatherstripping is provided to create a continuous barrier around the perimeter of the window. However, any shrinkage that occurs after the weatherstrip is cut to size in the T-slot will create gaps in the weather barrier around the perimeter of the door or window. Thus, if the weatherstripping is cut prior to recovery from this stretch, portions of the window or door may be unsealed.

Numerous solutions to the problem of weatherstripping thermoplastic stretch and shrinkage have been proposed. One method, for use with extruded vinyl windows, is to insert the weatherstripping into the vinyl window length during the extrusion of the vinyl profile, thereby eliminating the pull force which causes stretching. In a related solution, U.S. Pat. No. 4,458,450 to Young et al. discloses a pile weatherstrip with a hinged backing to permit the weatherstripping to be inserted into the T-slot directly, rather than pulled through the length of the profile. Another solution disclosed in U.S. Pat. No. 5,384,976 to Hall, is to fuse the pile fibres together in the vicinity of the backing to reduce their width and thereby allow them to slide more easily through the T-slot. U.S. Pat. No. 4,860,495 to Kessler discloses a lower friction pile weatherstrip to reduce the drag force experienced when it is pulled it into the T-slot. Another common practice, discussed in U.S. Pat. No. 5,979,036 to Socci et al., is to tack or stake the weatherstripping to the profile periodically along its length to minimize the unfixed lengths of weatherstripping in the profile, thereby reducing the amount by which the weatherstripping is permitted to shrink.

Prior art solutions remain unsatisfactory, however, mainly because of their overall ineffectiveness and/or associated expense. Accordingly, there is a need for thermoplastic weatherstripping with improved anti-stretch and anti-shrink characteristics.

SUMMARY OF THE INVENTION

In one aspect the present invention provides a weatherstrip comprising: a polymeric base portion adapted to be inserted into a slot, said base portion having a length, a longitudinal axis and a tensile modulus; a sealing portion mounted to said base portion along said length of said base portion, said sealing portion projecting from said base portion; said base portion including a composite portion extending along said length of said base portion and adhered to said base portion along said length, said composite portion having a plurality of strands embedded in a polymeric matrix portion, said strands having a tensile modulus greater than that of said base portion and being aligned in said matrix portion substantially parallel to said longitudinal axis of said base.

In a second aspect, the present invention provides a weatherstrip comprising: a polymeric base portion and a longitudinal axis; having a length and a longitudinal axis; a sealing portion mounted to said base portion along said length of said base portion, said sealing portion projecting from said base portion; and said base portion including a composite portion extending along said length of said base portion and adhered substantially continuously to said base portion along said length, wherein said composite portion has a plurality of strands embedded in a matrix portion, and wherein said strands when embedded in said matrix portion are substantially inextensible relative to said polymeric base portion and are aligned substantially parallel to said longitudinal axis of said base portion.

BRIEF DESCRIPTION OF THE DRAWINGS

For a better understanding of the present invention and to show more clearly how it may be carried into effect, reference will now be made by way of example to the accompanying drawings, which show articles made according to a preferred embodiment of the present invention, in which:

FIG. 1 is an end view of typical extruded window frame profile;

FIG. 2 is an end view of pile weatherstripping according to the prior art;

FIG. 3 is an isometric view of the prior art weatherstripping of FIG. 2 installed in the profile of FIG. 1;

FIG. 6 is an enlarged isometric view of the weatherstripping of FIG. 4 inserted into a T-slot;

FIG. 7 is an isometric view of the weatherstripping of FIG. 4 inserted into the window frame profile of FIG. 1;

DETAILED DESCRIPTION OF THE EMBODIMENTS

Figure 5:
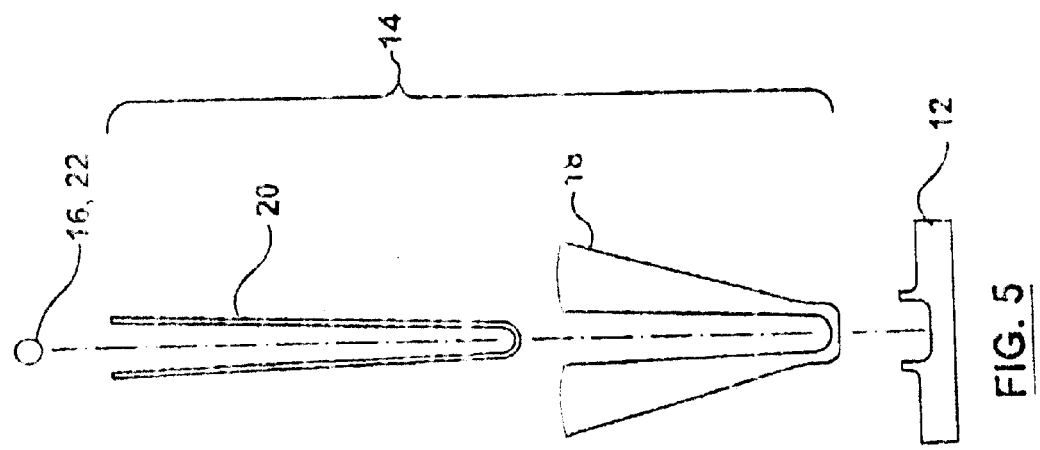
FIG. 5 is an exploded end view of the weatherstripping of FIG. 4.
Figure 4:
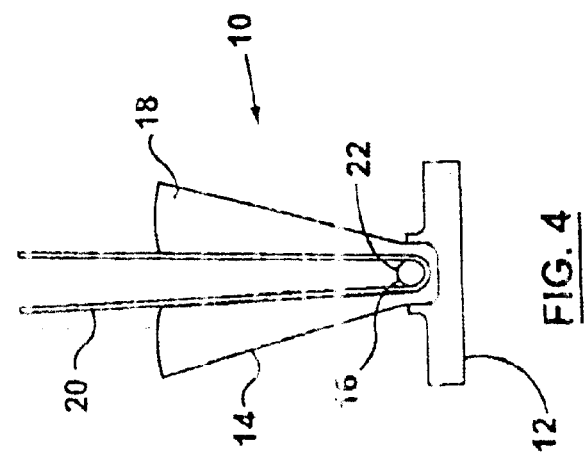
FIG. 4 is an end view of weatherstripping according to the present invention.

Weatherstripping according to the present invention is shown in the Figures generally at 10. Referring to FIGS. 4–7, weatherstripping 10 has a base portion or backing 12 to which is mounted to a sealing portion 14, which projects therefrom, and a composite portion in the form of a strip portion 16. Backing 12 is a woven or monolithic strip of a thermoplastic polymer material, in this case polypropylene. Sealing portion 14 includes a yarn pile 18 and may include one or more fins 20 welded to backing 12 along their lengths. Both pile 18 and fins 20 are made of a polymer material, in this case polypropylene. Fins 20 may be an imperforate film inserted in the interior of pile 18 provided for additional weather proofing, as disclosed in U.S. Pat. No. 4,148,953 to Horton and incorporated herein by reference. Strip portion 16 is a composite cord 22 which is also welded to backing 12 continuously along its length, as will be described in more detail below.

Figure 8:
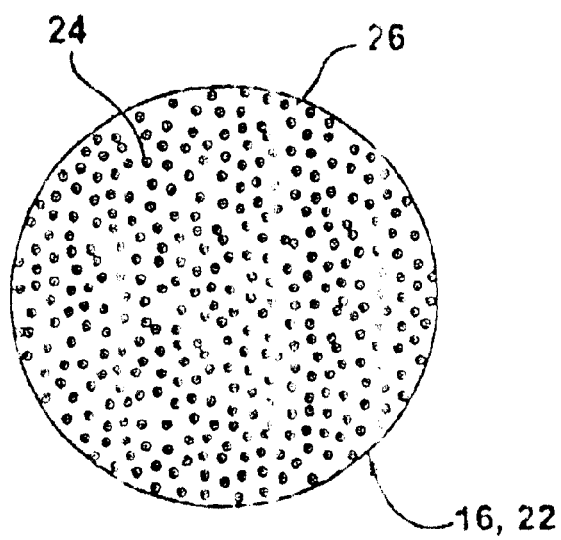
FIG. 8 is a greatly enlarged cross-sectional view of the fibreglass consolidate of the weatherstripping of FIG. 4.

Referring to FIG. 8, composite cord 22 comprises a plurality of continuous fibreglass strands 24 embedded in a polymer matrix 26, which is preferably also polypropylene. Fibreglass strands 24 are oriented in the same direction as cord 22 and other strands 24, and preferably are substantially parallel to the longitudinal axis of the cord and to each other, but do not contact one another and have minimal intertwining between strands 24. Also, matrix 26 is substantially free of voids and air pockets. Strands 24 are evenly distributed within the polymer matrix 26 and are fully encapsulated by polymer matrix 26. The strands-to-matrix volume ratio of strip portion 16 is approximately 1:2 (i.e. about 35% glass to 65% polymer, by volume). Composite cord 22 is sized to suit weatherstripping 10. For a typical weatherstripping having a backing 12 with a cross-sectional width of 0.187", composite cord 22 may have an overall diameter of between about 0.010" and 0.040". The diameter of the individual strands 24 is about 17 microns. The use of smaller diameter strands 24 increases the overall strand surface area to be wetted by matrix 26, which thereby increases the intimacy of the contact between strands 24 and matrix 26. The increased contact results in strands 24 being better secured in the desired orientation (i.e. straight and parallel to the cord longitudinal axis) in matrix 26.

Composite cord 22 is provided from a consolidated 0.022" diameter cord of TWINTEX™ (trade mark of Vetrotex Saint Gobain), made in accordance with U.S. Pat. No. 5,011,523 to Roncato et al., incorporated herein by reference. TWINTEX™, in its unconsolidated form, is a composite of co-mingled strands of continuous E-glass fibres and thermoplastic fibres. As is well known in the art, heat and pressure can be applied to such an unconsolidated "prepreg" to consolidate the composite into a cord or sheet having glass fibres embedded in a polymer matrix. To provide strip portion 16, a TWINTEX™ yarn composed of an appropriate mixture of fibreglass strands and polypropylene strands is consolidated by heating the yarn until the matrix material has been brought to a molten plastic condition. As well, alternate methods of consolidating cord 22 may be used. The heated cord is then pressed through hot dies until the polypropylene melts and fully encapsulates the fibreglass strands in the plastic in a linear and parallel orientation, according to a consolidation technique well known in the art. The consolidated cord is then formed in the desired shape and then cooled. It may then be stored by winding onto large diameter cores to minimize distortion, or attached immediately to weatherstripping 10, as described below.

Once cord 22 has been consolidated, it is attached to backing 12 in a continuous manufacturing process, such as by welding. One method of attachment is to ultrasonically weld cord 22, fins 20 and pile 18 to backing 12 all at the same time. The pieces are assembled as shown in FIG. 5, with cord 22 sandwiched inside fins 20 and pile 18, and are then welded together. During the welding (or other attachment) process, cord 22 is maintained slightly in tension as it is attached to backing 12 to maintain the linear orientation of fibreglass strands 24 parallel to the longitudinal axis of weatherstripping 10. Though shown with a circular cross-section in the FIG. 4, cord 22 will deform when welded to weatherstripping 10. While some cross-sectional distortion of cord 22 may occur during the ultrasonic welding process, if sufficient tension is maintained on cord 22 the orientation of fibreglass strands 24 will remain substantially parallel and linearly oriented relative to weatherstripping 10. Furthermore, in the welding process it is preferred that backing 12 is push-fed into the ultrasonic welding machine to create a slight compression in backing 12 prior to its attachment to cord 22. Since there are often residual stresses in plastic weatherstripping, this slight pre-compression tends to compensate for residual stresses which may be present in backing 12. However, since the force required to stretch fibreglass strands 24 is higher than the forces of pre-compression, the pre-compressive force in backing 12 is insufficient to cause weatherstripping 10 to expand after welding.

Once cord 22 has been attached to backing 12, weatherstripping 10 can be wound onto rolls or installed into door and window frames in the normal manner. In use, weatherstripping 10 is inserted into a door or window profile by pulling backing 12, with strip portion 16 integrally mounted thereto, into the T-slot.

Weatherstripping 10 in use is often exposed to direct sunlight and other elements which are well-known to cause degradation in polymers. Ultraviolet light (UV) degradation is of particular concern. Consequently, appropriate measures should be taken to protect weatherstripping 10 and, of particular interest here, composite cord 22. Composite cord 22 is preferably provided with appropriate UV inhibitors, and other measures should be taken to protect against temperature effects.

It may be preferable to treat cord 22 at some point prior to attachment to weatherstripping 10 to enhance its bonding characteristics vis-à-vis backing 12. Where thermal welding is used, it is may be desirable to add an additional polymer layer over the consolidated cord 22, or to oxygenate the cord using, say, an ozone corona treating process, to enhance its welding characteristics.

The advantage provided by weatherstripping 10 according to the present invention is that substantially reduced stretch is experienced when weatherstripping 10 is pulled into a long T-slot channel. This is because the pulling load is transmitted by the fibreglass strands and not the polymeric backing. Fibreglass strands 24, oriented linearly in strip portion 16 relative to backing 12, tend to carry the pull-in load because of the comparatively high tensile modulus of strands 24 relative to polymer backing 12 (i.e. 3,900,000 psi for fibreglass versus 170,000 psi for polypropylene), and their pre-orientation allowing them to immediately carry the load. Because strands 24 substantially carry the pull-in load and because their tendency to stretch and permanently deform (i.e. creep) is much-reduced over that of the polypropylene backing, the amount of stretch experienced by weatherstripping 10 on installation is much reduced. Thus, the present invention substantially reduces backing stretch, as well as reducing the shrinkage which would otherwise occur when the stretched weatherstrip tries to revert to its original length. A small reduction in shrinkage is also experienced because the linear orientation of fibreglass strands also provides resistance to compressive forces induced by residual stresses in the polymer components of weatherstripping 10, and particularly backing 12. Depending on cord shape, strands 24, when substantially continuously adhered to backing 12, tend to resist loads better than the polymeric backing 12. Their substantially continuous adherence to backing 12 permits strands 24, which would otherwise bend or buckle under a compressive load, to resist the load without bending. Thus, because strands 24 can resist compressive loads (depending on their size and shape, as stated), there can be a reduced tendency of weatherstripping 10 to shrink under the compressive effect of residual stresses in backing 12.

The overall improved stretch/shrinkage performance permits the weatherstripping of the present invention to be installed in T-slots of various qualities and configuration without the degree of stretch and shrinkage experienced with the prior art. Also, because weatherstripping 10 is stretch and shrink resistant, simpler and less sensitive automatic insertion machines may be used.

Another advantage of the present invention is that, by reason of its polymeric matrix, strip portion 16 may be directly welded or otherwise bonded to a weatherstripping 10 of a compatible polymer without much difficulty or effort. Typically, materials like fibreglass are not easily bonded to polymers like polypropylene, however this problem is overcome in the present invention.

It has been found that the present invention significantly reduces stretch and shrinkage over the unreinforced weatherstripping of the prior art. For example, for a standard 0.187" pile weatherstripping having a backing 0.187" wide by 0.031" thick made of polypropylene, it has been found that the stretch experienced by pull-inserting the weatherstripping into a 20-foot profile can be decreased by as much as 80% with the present invention.

One skilled in the art will appreciate that various modifications may be made to the present invention without departing from the fair scope of the appended claims. For example, while full encapsulation of the fibreglass strands in the polymer matrix and the exclusion of air and voids are desirable, this is not essential. It is preferred because it prevents water from contacting fibreglass strands, thereby protecting the fibreglass strands from weakening and/or breakage during use. Full encapsulation also minimizes fibreglass strand breakage due to ultrasonic forces on the composite cord during welding. Furthermore, the fibreglass strands, when fully oriented linearly within the cord have a reduced risk of shear failure since there is no linear motion of the fibreglass strands except when the strands are under load.

While it is preferred that strands 24 be continuous through cord 22, to permit cord 22 to transfer a tensile load therealong without substantial deformation (relative to the plastic), one skilled in the art will appreciate that strands 24 need not strictly be continuous, but should be what is described herein in respect of the strands as substantially continuous. To be substantially continuous, the strands are either continuous (i.e. the length of the cord 22) or, where a shorter strand length is used, the lengths of the shorter strands 24 and the amount of overlap between adjacent strands (axially and laterally) in the matrix of cord 22 is sufficient to permit a tensile load to be transferred through the strands 24 (in the consolidated matrix) without substantial slippage between adjacent strands. It is believed that strands 24 should be no less than about 5 inches in length to achieve this result satisfactorily. Though shorter lengths are possible, a drop in anti-stretch performance may be experienced.

Figure 9:
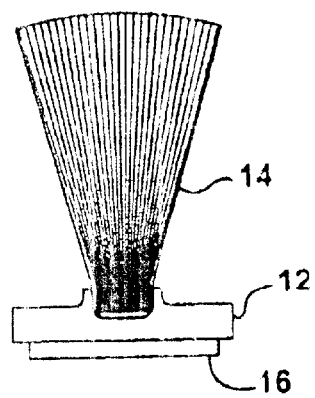
FIG. 9 is an end view of an alternate embodiment of weatherstripping according to the present invention.
Figure 10:
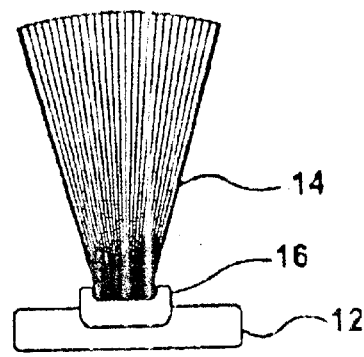
FIG. 10 is an end view of a further alternate embodiment of weatherstripping according to the present invention.
Figure 11:
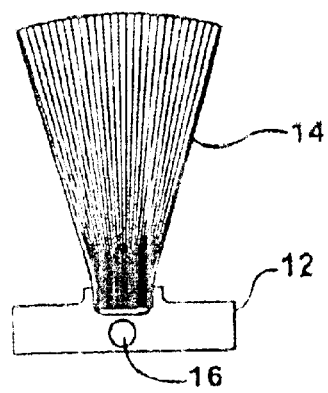
FIG. 11 is an end view of a still further alternate embodiment of weatherstripping according to the present invention.

Strip portion 16 may be mounted or adhered to weatherstripping 10 in a variety of alternate ways. One option is to ultrasonically weld strip portion 16 to backing 12 in a second operation after sealing portion 14 have been attached to backing 12. Another option is to use an adhesive. Still another option is to weld strip portion 16 to backing 12 in a location where it does not contact sealing portion 14, such as to the underside of backing 12 as shown in FIG. 9. Alternately, strip portion 16 may be disposed between backing 12 and sealing portion 14, as shown in FIG. 10, or may be extruded into backing 12 during the extrusion manufacture of backing 12, as shown in FIG. 11. Where backing 12 is manufactured from a sheet, rather than extruded individually, strip portion 16 can be imbedded in backing 12 using a calendaring process of manufacture. Also, while it is preferred that strip portion 16 be continuously adhered directly or indirectly, to backing 12, it may be tacked at intervals along backing 12. The longer the intervals, however, the less benefit that may be experienced with the present invention.

Figure 12:
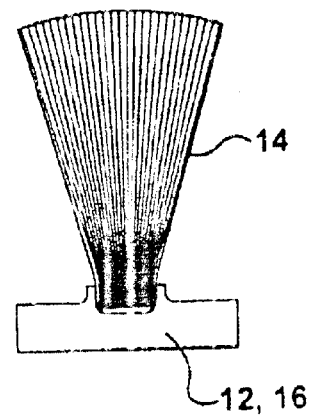
FIG. 12 is an end view of another alternate embodiment of weatherstripping according to the present invention.

Strip portion 16 need not be a cord 22, nor be circular in cross-section, but rather may be any shape and configuration convenient for combining strip portion 16 with weatherstripping 10, or otherwise attaching it thereto. See, for example, FIG. 9 (strip portion 16 is a flat strip) and FIG. 10 (strip portion 16 has a U-shaped cross-section). In another aspect, strip portion 16 may be integral with backing 12 and thus provided in a single component, as shown in FIG. 12. A circular cross-section is preferred because it is easier to untwist any minor twisting of cord 22 which may occur in handling cord 22 prior to installation on weatherstripping 10.

Referring again to FIG. 9, an embodiment is shown where the pile of sealing portion 14 is woven into a woven backing 12, rather than bonded to the surface thereof. The pile may be woven into a woven backing 12 according to known methods in almost all of the disclosed embodiments, as will be understood by one skilled in the art.

Figure 13:
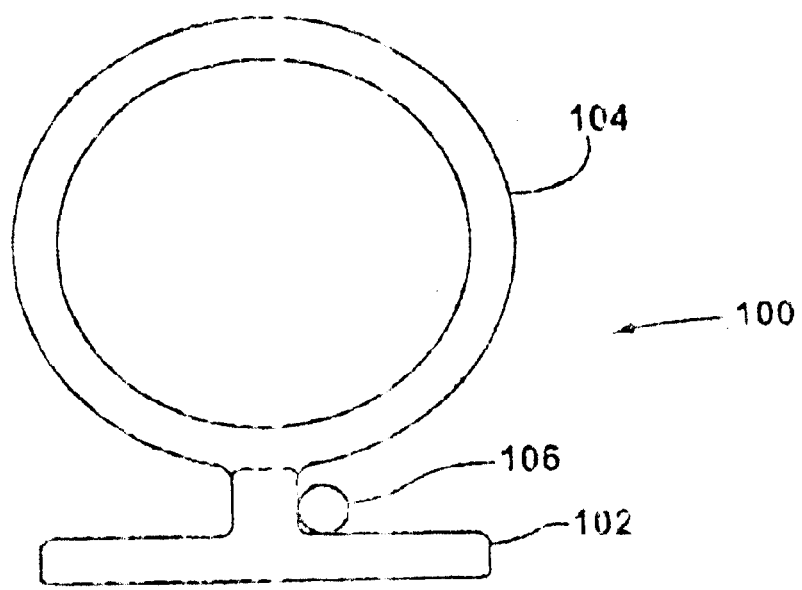
FIG. 13 is an end view of another alternate embodiment of weatherstripping according to the present invention.

The polymeric materials of backing 12, sealing portion 14 and matrix 26 need not be the same, as long as they are compatible in that they may be bonded to one another. The present invention may also be applied to weatherstripping made of other olefinic materials, such as thermoplastic rubber (TPR) or other thermoplastic elastomers (TPE), and ethylene-propylene-diene monomer (EPDM). TPRs and EPDMs are common material choices for use in weatherstripping. Referring to FIG. 13, a TPR weatherstripping according to the present invention is shown at 100. Weatherstripping 100 has a polypropylene base portion 102, with a TPR or EPDM weatherstripping portion 104 and a fibreglass+polypropylene strip portion 106 welded continuously thereto along their lengths.

Strands 24 need not be fibreglass but may be other materials having a high tensile modulus (relative to the polymer) which are capable of consolidation in a polymer matrix to provide a composite portion of the type described above. Other strand materials include aramid (known commercially as KEVLAR™, a trade mark of E. I. Du Pont De Nemours and Company), carbon fibre and, in some instances, metal wire.

The present invention is not limited for use with surfaces having T-slots defined therein, but may be used to advantage with any configuration of slot, and particularly those where a pull-in or push-in type installation is used.

I claim:

1. A weatherstrip comprising:
   a polymeric base portion shaped to fit into a slot so that the base portion can be inserted into said slot, said base portion having a length, a longitudinal axis and a tensile modulus;
   a sealing portion mounted to said base portion along said length of said base portion, said sealing portion projecting from said base portion;
   said base portion including a composite portion extending along said length of said base portion and adhered to said base portion along said length, said composite portion having a plurality of substantially continuous strands dispersed in and substantially fully encapsulated in a polymeric matrix portion, said strands having a tensile modulus greater than that of said base portion and being aligned in said matrix portion substantially parallel to said longitudinal axis of said base.

2. The weatherstrip of claim 1 wherein said composite portion is substantially free of voids and entrapped air.

3. The weatherstrip of claim 2 wherein said strands are substantially free from contact with each other.

4. The weatherstrip of claim 3 wherein said composite portion is integral with said base portion.

5. The weatherstrip of claim 3 wherein said composite portion is a discrete member separate from said base portion and is adhered substantially continuously to said base portion along said length.

6. The weatherstrip of claim 1 wherein said strands are continuous and fibreglass.

7. The weatherstrip of claim 1 wherein said composite portion is 35% glass and 65% polymer by volume.

8. The weatherstrip of claim 1 wherein said matrix portion is made of the same polymer as said base portion.

9. The weatherstrip of claim 1 wherein said base portion and said matrix portion are olefinic polymers.

10. The weatherstrip of claim 9 wherein said polymer is selected from the group consisting of polypropylene, thermoplastic rubbers and ethylene-propylene-diene monomers.

11. The weatherstrip of claim 1 wherein said sealing portion comprises at least one row of pile fibres.

12. The weatherstrip of claim 1 wherein said sealing portion further comprises an impervious membrane extending longitudinally along said base portion and attached thereto.

13. The weatherstrip of claim 1 wherein base portion is a woven material.

14. The weatherstrip of claim 1 wherein said composite portion is attached to said base portion by a weld.

15. A weatherstrip comprising:
    a polymeric base portion and a longitudinal axis; having a length and a longitudinal axis;
    a sealing portion mounted to said base portion along said length of said base portion, said sealing portion projecting from said base portion; and
    said base portion including a composite portion extending along said length of said base portion and adhered substantially continuously to said base portion along said length,
    wherein said composite portion has a plurality of substantially continuous strands dispersed in and substantially fully encapsulated in a matrix portion, and wherein said strands when encapsulated in said matrix portion are substantially inextensible relative to said polymeric base portion and are aligned substantially parallel to said longitudinal axis of said base portion.

16. The weatherstrip of claim 15 wherein said strands are fibreglass strands and wherein said matrix portion is a polymer.

17. The weatherstrip of claim 16 wherein said matrix portion is made of an olefinic polymer and said base portion is made of an olefinic polymer.

* * * * *